United States Patent
Cortes I Herms et al.

(10) Patent No.: US 10,723,115 B2
(45) Date of Patent: Jul. 28, 2020

(54) COOLING TIMES FOR THREE-DIMENSIONAL OBJECTS

(71) Applicant: Hewlett-Packard Development Company, L.P., Houston, TX (US)

(72) Inventors: Sebastia Cortes I Herms, Sant Cugat del Valles (ES); Xavier Vilajosana, Sant Cugat del Valles (ES); Scott A. White, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 471 days.

(21) Appl. No.: 15/509,738

(22) PCT Filed: Sep. 30, 2014

(86) PCT No.: PCT/US2014/058337
§ 371 (c)(1),
(2) Date: Mar. 8, 2017

(87) PCT Pub. No.: WO2016/053303
PCT Pub. Date: Apr. 7, 2016

(65) Prior Publication Data
US 2017/0282459 A1    Oct. 5, 2017

(51) Int. Cl.
*B33Y 30/00* (2015.01)
*B33Y 50/02* (2015.01)
(Continued)

(52) U.S. Cl.
CPC .............. *B33Y 30/00* (2014.12); *B29C 35/16* (2013.01); *B29C 64/393* (2017.08); *B33Y 10/00* (2014.12); *B33Y 50/02* (2014.12)

(58) Field of Classification Search
None
See application file for complete search history.

(56) References Cited

U.S. PATENT DOCUMENTS 5,495,328 A * 2/1996 Spence ................. G01J 1/4257
356/121
5,658,412 A   8/1997 Retallick et al.
(Continued)

FOREIGN PATENT DOCUMENTS

CN    101623929 A    1/2010
DE   102008024288 A1  12/2009
(Continued)

OTHER PUBLICATIONS

International Search Report and Written Opinion dated Jun. 29, 2015, PCT Patent Application No. PCT/US2014/058337 filed Sep. 30, 2014, Koren Intellectual Property Office.
(Continued)

*Primary Examiner* — Michael P. Rodriguez
(74) *Attorney, Agent, or Firm* — HP Inc. Patent Department

(57) ABSTRACT

In one example, a method of controlling generation apparatus for generating a three-dimensional object is described. For example, data indicative of at least one physical property affecting heat transfer from an object may be determined and used to determine a cooling time, and a component of the generation apparatus may be controlled in response to the determined cooling time.

9 Claims, 4 Drawing Sheets

(51) Int. Cl.
*B29C 64/393* (2017.01)
*B29C 35/16* (2006.01)
*B33Y 10/00* (2015.01)

(56) References Cited

U.S. PATENT DOCUMENTS

| | | |
|---|---|---|
| 6,572,807 B1 | 6/2003 | Fong |
| 7,351,051 B2 | 4/2008 | Hagiwara |
| 7,569,174 B2 | 8/2009 | Ruatta et al. |
| 2004/0200816 A1 | 10/2004 | Chung et al. |
| 2005/0116391 A1 | 6/2005 | Lindemann et al. |
| 2006/0118532 A1* | 6/2006 | Chung .................. B22F 3/1028 219/121.85 |
| 2009/0152771 A1* | 6/2009 | Philippi .................. B33Y 10/00 264/410 |
| 2009/0295042 A1* | 12/2009 | Pfister ........................ C08J 3/28 264/497 |
| 2012/0231175 A1 | 9/2012 | Tan |
| 2013/0073068 A1 | 3/2013 | Napadensky |
| 2013/0108460 A1 | 5/2013 | Szwedowicz et al. |

FOREIGN PATENT DOCUMENTS

| | | |
|---|---|---|
| EP | 1384565 A1 | 1/2004 |
| EP | 1669143 A1 | 6/2006 |
| JP | 2001-079912 | 3/2001 |
| JP | 2002-067172 | 3/2002 |
| JP | 2006006717 | 1/2006 |
| JP | 2008-030247 | 2/2008 |
| JP | 2010-006057 | 1/2010 |
| JP | 2010-158841 | 7/2010 |
| JP | 2010184412 | 8/2010 |
| JP | 2013067017 | 4/2013 |

OTHER PUBLICATIONS

Sachs, E. et al., "Production of Injection Molding Tooling with Conformal Cooling Channels Using the Three Dimensional Printing Process", Jul. 2, 2008, 18 pages. https://sffsymposium.engr.utexas.edu/Manuscripts/1995/1995-56-Sachs.pdf.

* cited by examiner

COOLING TIMES FOR THREE-DIMENSIONAL OBJECTS

Additive manufacturing systems that generate three-dimensional objects on a layer-by-layer basis have been proposed as a potentially convenient way to produce three-dimensional objects.

BRIEF DESCRIPTION

Examples will now be described, by way of non-limiting example, with reference to the accompanying drawings, in which.

DETAILED DESCRIPTION

Additive manufacturing techniques may generate a three-dimensional object through the solidification of a build material. The build material may be powder-based and the properties of generated objects may depend on the type of build material and the type of solidification mechanism used. In a number of examples of such techniques, build material is supplied in a layer-wise manner and the solidification method includes heating the layers of build material to cause melting in selected regions. In other techniques, chemical solidification methods may result in heat being generated. In still further techniques, heated build material is supplied so as to solidify on cooling into the form desired for the object.

Additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified/caused to coalesce by the additive manufacturing system.

In some additive manufacturing techniques, objects are generated within a receptacle. At the end of the solidification process, the receptacle may contain both un-solidified/un-coalesced build material (which may be a powder) and the generated object or objects.

The time taken to produce a three-dimensional object is dependent on a number factors, including the number of layers. However, in particular for techniques which comprise heating the build material, a substantial portion of the production time may be taken up with cooling the object after formation, for example allowing it to become more rigid and/or robust, and/or safer to handle by reducing the risk of burns to a handler. This cooling step can take a significant portion, in some examples 50% or more, of the production timeline. However, the cooling should not be unduly hurried, as this can result in unfavourable mechanical properties in the finished article, such as brittleness, structural irregularities, warping of the shape of the object, poor quality surface finishing, lower strength than could be achieved by slower cooling and/or poor adhesion between the layers.

Figure 1:
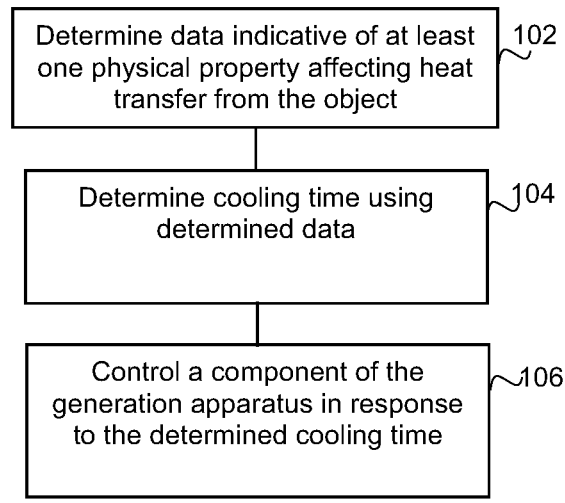
FIG. 1 is an example of a method of controlling generation apparatus for generating three-dimensional objects.

An example of a method of controlling generation apparatus for generating a three-dimensional object is described with reference to FIG. 1. As shown in FIG. 1, the method may comprise determining data indicative of at least one physical property affecting heat transfer from the object (block 102); determining a cooling time using the determined data (block 104); and controlling a component of generation apparatus in response to the determined cooling time (block 106).

There are various techniques for generating a three-dimensional object by heating a build material. In some such methods, including sintering techniques, portions of a layer of build material are selectively heated causing the selected portions to soften and then cool, forming the desired object. In some examples, the object may be generated by solidifying a build material in a layer-wise manner. In some examples, the build material may be heated before being placed in situ (for example being extruded or jetted after heating) such that it cools to form the desired object.

Once formed, such objects may have an elevated temperature compared to their environment. They may in turn cool to a lower temperature, which may be a predetermined or desirable temperature. In some examples, a cooling time to reach this temperature may be an estimated cooling time based on, for example, heat transfer characteristics of an object, or the object in situ in a manufacturing receptacle. In other examples, a cooling time may be, or may include a consideration of, a desired or determined cooling time, for example the shortest cooling time which is possible, as long as the mechanical properties of the object are not adversely affected (or are not unacceptably adversely affected).

A large, solid object, for example, will take longer to cool than an object which is smaller or has a greater surface area, or the like. In addition, some objects may be permitted or caused to cool more quickly than others without undue detriment to the quality of an object. Determining a cooling time may therefore be based on a consideration of a physical property of the product of the generation apparatus which affects heat transfer from the object. This may be for example a property of at least a portion or aspect of the object or objects produced, and/or of the object(s) in situ.

Examples of physical properties of an object which may be considered in relation to cooling times may for example include any, or any combination of:
 (i) the material or materials from which it is formed,
 (ii) its weight/mass and/or volume,
 (iii) the shape/structure of the object, which may comprise, for example consideration of the thickest regions thereof and/or surface area,
 (iv) the number of layers used to form the object
 (v) any object dimension,
 (vi) the object's temperature,
 (vii) object thermal conductivity,
 (viii) object heat transfer coefficients.

Some of these qualities are related. For example, a given material may have a particular thermal conductivity. In some cases, the intrinsic rate of heat transfer may be increased by a property, and in others, heat transfer will decrease. For example, a relatively high surface area and/or thermal conductivity may tend to increase heat transfer, whereas thick portions, greater mass, larger dimensions, and/or a larger number of layers may tend to decrease heat transfer.

In addition, the object or objects may be generated within a receptacle and may be surrounded by other material, such as un-coalesced build material, or indeed several objects may be produced in the same receptacle, as part of the same 'build volume'. Therefore, other physical proprieties which may affect the cooling time may comprise:

(i) the volume of build material to produce the object(s), whether or not the material actually forms part of the object (which may be the volume of material within the receptacle);

(ii) the placement of an object within a receptacle (for example, an object near an edge may cool faster);

(iii) a combination, arrangement, and/or physical properties of any objects generated at one time or within the same 'build volume' as enclosed by the receptacle.

In some examples the heat transfer may be the desirable heat transfer, such as a cooling rate above which the object may be adversely affected. Physical properties also affect such a desirable heat transfer. For example, some materials may be cooled more rapidly than others without detriment, and some structures or shapes may be less prone to detriment such as warping than others.

In some examples, determination of the cooling time may be based on previous observations of the cooling times of similar objects. In other examples, the cooling time may be determined using heat transfer models based on thermodynamic principles. In some examples, the effect of a particular determined physical property on heat transfer from an object is predetermined and may for example be held in a memory.

If the product is to be actively cooled by a heat extraction apparatus, the cooling time may also be determined using at least one property of the heat extraction apparatus, such as heat extraction rate(s) or energy consumption. Where a heat extraction apparatus is used, it may be that there is a minimum desirable cooling time which is longer than that which could be achieved using the heat extraction apparatus. In some examples, this may mean that the heat extraction apparatus is operated below its peak abilities in terms of heat extraction, for example to ensure that there no undue detriment to the physical properties of the object once cooled.

In other examples, the cooling time may be determined using a temperature associated with object generation (for example, the temperature to which the build material is heated to cause coalescence). A higher temperature may result in a longer cooling time.

The data used in determining a cooling time may determined in any manner, or in a range or combination of manners, for example by measurement of a property; supplied from a data source such as a database or look-up table; derived from a model for controlling the formation of the object (e.g. a CAD model or the like); read from a memory; etc. In some examples, it may be that data is determined in a manner which does not affect cooling (for example, avoiding any need for the object to be handled or inspected).

If the cooling time is determined using a consideration of at least one physical property affecting heat transfer from the generated object, it is more likely to provide an accurate indication of the time at which the object(s) generated may be safely handled. When compared to, for example, providing a standard cooling time for a three-dimensional object generation apparatus, which may be conservative for the sake of safety and therefore result in unnecessarily long waiting times, or insufficient and therefore a safety concern in respect of certain objects and/or materials, this provides an appropriate waiting time, considering the actual output of the apparatus which comprises the generated object(s).

Once determined, a cooling time can be used to control a component of generation apparatus appropriately. This may for example comprise controlling a component to display an indication related to the cooling time, or controlling an interlock or heat extraction apparatus. Examples of controllable components are discussed below. The step of controlling may be carried out locally or remotely, for example over a network. In some examples, the method may also comprise generating the object.

Figure 2:
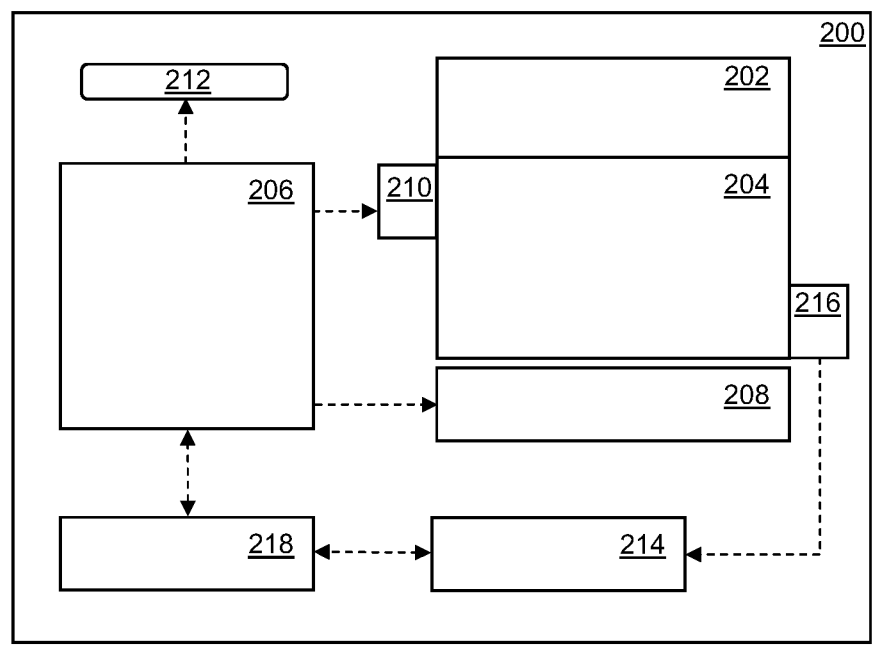
FIG. 2 shows a schematic representation of a three-dimensional object generating apparatus according to one example.

FIG. 2 is a schematic representation of a three-dimensional object generation apparatus 200 for generating a three-dimensional object from a build material, wherein the apparatus 200 comprises object generation module 202 which generates an object by heating a build material. The apparatus 200 also comprises an object receptacle 204 which houses a generated object.

For example, if the apparatus 200 is a sintering apparatus, the object may be formed layer by layer within the receptacle 204, and the object generation module 202 may comprise a source of build material, a source of heat (and possibly other agents to aid and/or control coalescence), and processing circuitry to control how heat and/or other agents are applied to the build material to generate the object layer by layer. For example, within the receptacle 204, a first layer of build material, which may be a powder-like material, may be provided on a suitable support member. Energy (for example, light) may be selectively applied to, or preferentially absorbed by, portions of the build material within the layer, causing those portions to heat and the material to coalesce. A second layer of build material may be applied on top of the first layer and similarly heated to cause portions thereof to coalesce, and so on. Once the object is thus fully formed in a layer-wise manner, it is housed within the receptacle 204 and surrounded by un-coalesced build material.

However, this is just one example of object generation module 202 and the object may be formed by any other suitable method of generating a three-dimensional object from a build material by heating the material.

In this example, the apparatus 200 further comprises a controller 206 and at least one controllable component. In this example, the controllable components comprise heat extraction apparatus 208, an interlock 210, and a display 212. Each of the controllable components may be controllable by the controller 206 in response to a determined cooling time, the cooling time having for example been determined using data indicative of at least one physical property of a content of the object receptacle 204 following generation of the object. A physical property may be projected (i.e. determined or determinable before the object is made) or determined after the object is generated.

In other examples, the apparatus 200 may comprise fewer, more or different controllable component(s).

In addition, in this example, the apparatus 200 further comprises a memory 214 and a temperature sensor 216, capable of monitoring a temperature indicative of the object within the receptacle 204. This may for example comprise determining the temperature of the receptacle 204, a portion thereof, or of the un-coalesced build material within the receptacle 204.

In this example, the controller 206 is associated with a processor 218 which is capable of determining a cooling time. In other examples, this processing may be carried out by a different entity, such as a separate computing device, and supplied to the controller 206, or directly to controllable component(s).

Figure 3:
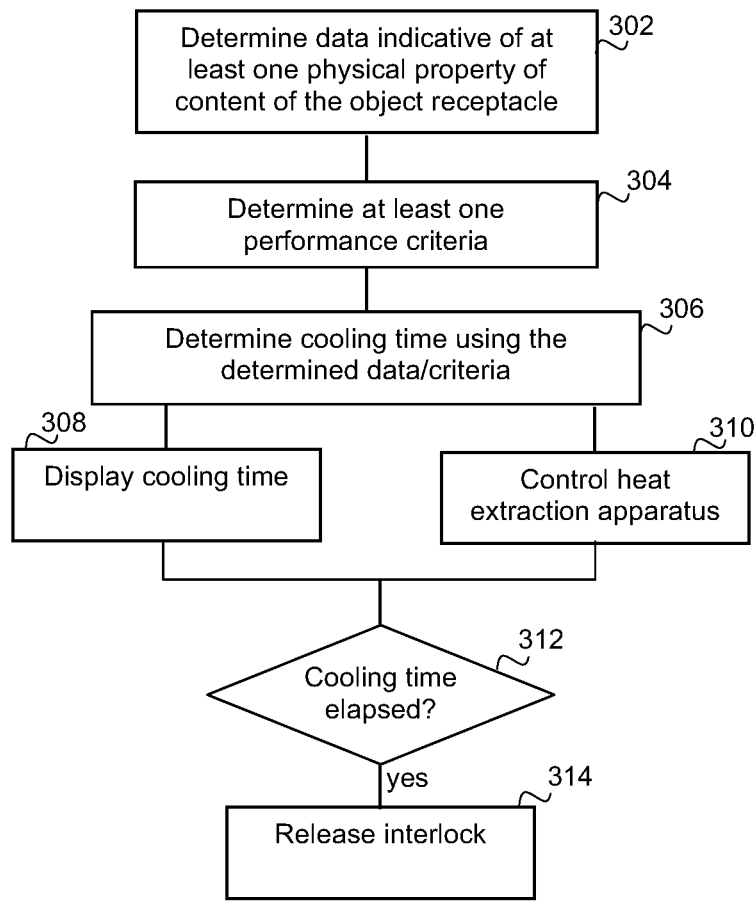
FIGS. 3 and 4 show examples of methods relating to cooling times for generated three-dimensional objects.

In one example, the apparatus 200 operates according a method as set out in FIG. 3.

In block 302, data indicative of at least one physical property of the content of the receptacle 204 is determined by the processor 218, for example as discussed in relation to block 102 above. This step may be carried out before or after the object is actually generated, and may therefore relate to the content which the receptacle will contain following object generation. In this example, this may be data indicative of physical property or properties of a particular generated (or to be generated) object, for example determined from information held in the memory 214, and which may comprise any, or any combination, of: information concerning the build material used, object shape, object weight, object volume, any object dimension, the volume of build material used to form the object (i.e. the volume of build material in the receptacle 204), the number of layers used to generate the object, the temperature used to generate the object, or the like. Data relating to maximum and/or desired cooling rates is also indicative of a physical property of the object, and may be related to the material, structure, or the like, as some materials/structures allow quicker cooling than others without detriment (or without excessive/acceptable detriment). In other examples, the data indicative of at least one physical property may comprise an indication of temperature determined using the temperature sensor 216.

In block 304, at least one desired performance criteria is determined by the processor 218. This or these criteria may for example relate to a desired property of the object, such as whether the object is to be manufactured to a 'draft', a 'normal', or a 'best quality' standard. As noted above, it may be that the properties of an object are diminished by quick cooling. However, the reduced time taken to produce a cooled object may be desirable and, if it is acceptable in the circumstances to produce an object in which quality may be reduced, quick cooling may be utilized to achieve this. In other examples, the performance criteria may relate to a desired maximum cooling time, or a desired level of energy consumption by the heat extraction apparatus 208, or the like. For example, a user or operator may specify an 'economy' setting in which use of the heat extraction apparatus 208 is minimized or simply not made, or a 'rapid cool' setting, in which the heat extraction apparatus 208 is increased, in some examples as far as possible without falling below desired object property standards.

In this example, the desired performance criteria may be held in the memory 214, but in other examples it may be supplied from a different source, for example following operator input, or the like.

The cooling time may then be determined by the processor 218 using the determined data indicative at least one physical property and at least one desired performance criteria (block 306). Other factors may be considered, such as the time elapsed since the end of the object generation stage, or the like. The cooling time may, for example, be the time for the object to become cool enough to be safely handled, for example in terms of its robustness, or for the safety of the handler, or for a combination of these (and/or other) considerations.

Once the cooling time has been determined, the controller 206 controls the display 212 to display an indication relating to the cooling time (block 308). This may for example be the total cooling time, or may comprise a 'countdown' of the remaining cooling time, or other indication such as proportion of cooling time remaining, or the like. The display 212 may be provided by any suitable display means, such as a Liquid Crystal Display (LCD), a Light Emitting Diode (LED) display, a matrix display, or the like. This provides a user or operator with useful information concerning the process.

In this example, the controller 206 also controls the heat extraction apparatus 208, for example causing it to cool the receptacle 204 and/or any content thereof (block 310).

The heat extraction apparatus 208 may comprise a heat exchanger, a fan, a refrigeration unit, or any other suitable heat extraction apparatus. The rate of heat extraction may be determined according to a desired cooling time (for example, if operating in a 'rapid cool' or 'economy' setting), or such that a particular cooling rate is not exceeded. In some examples, the heat extraction apparatus 208 may be controlled such that it operates consistently for the duration of the cooling time. However, in other examples, it may operate according to a desired cooling profile, and/or have a variable heat extraction rate. Such an example is discussed in greater detail in relation to FIG. 4 below.

In block 312, the processor 218 determines whether the cooling time has elapsed. If so, in block 314, the controller 206 releases the interlock 210, allowing the receptacle 204 to be opened and the object housed therein to be accessed. The interlock may be any lock capable of being selectively released, such as a relay or electromechanical locking device. This therefore prevents removal and handling of an object before the cooling time has elapsed.

The method described in FIG. 3 allows certain tradeoffs to be made: for example, time may be sacrificed for quality and/or economy and vice versa.

In addition, suitable use may be made of heat extraction apparatus 208. In order to preserve the physical properties of the object, a conservative approach to cooling has meant that active heat extraction has been considered unduly risky in additive manufacturing techniques of the type described herein. However, by considering the actual physical properties of the product generated, a heat extraction rate may be controlled appropriately to result in desired object properties. Determination of a desirable rate or rates result in effect in the determination of cooling time, therefore the determination of a cooling time may comprise the determination of a cooling rate, whether or not an actual time is determined therefrom.

Figure 4:
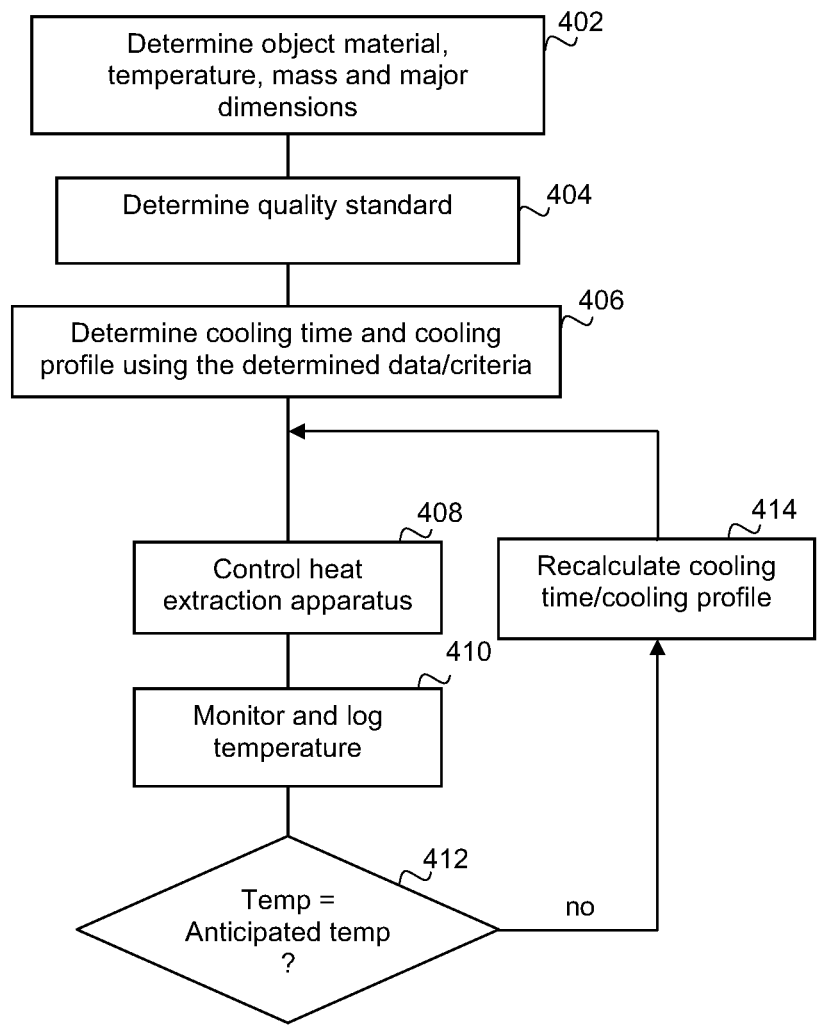

Another example of a method of operation of the apparatus of FIG. 2 is now described with reference to FIG. 4. In this example, data indicative of at least one physical property of the object which affects heat transfer from the object is determined, the data comprising a material type, temperature, the mass of the object and its major dimensions (block 402). The mass and the major dimensions are determined from a CAD model used to produce the object, and the temperature is provided by the temperature sensor 216, and the material type is provided from the memory 216. Performance criteria, in this example comprising a quality standard (e.g. draft, standard or best), is also determined (block 404). The cooling time may then calculated based on these. However, in this example, the apparatus additionally determines a cooling profile (block 406).

The profile may for example relate to a maximum cooling rate, for example, the rate above which physical properties will be undesirably adversely affected, such as for example falling below the determined quality standard. In other examples, there may be a maximum or desirable time and/or power usage allotted to the cooling process and the cooling is desired to be performed within this time/power usage limit.

It may also be the case that different cooling rates may be desirable at different times during the cooling time. For example, it may be that, below a certain temperature, the physical properties of an object will be stable while the object may remain too hot to handle. Below this temperature, there may be no risk of degrading the physical properties. Therefore, for example if a short object production time is desirable, the heat extraction apparatus 208 may be controlled to operate to extract heat at a relatively slow rate (or indeed, be controlled so as not operate at all) initially until the temperature is reached, and then controlled to operate to extract heat at a relatively fast rate until a safe handling temperature is reached. Other cooling profiles may be appropriate depending, for example, on the properties of the build material, generated object and/or desired performance criteria.

Therefore, different heat extraction rates may be employed during the cooling time.

Once a desired cooling profile has been determined, the heat extraction apparatus 208 is controlled in order to cool the object according to this profile (block 408). The method could proceed assuming that the cooling profile will be achieved through appropriate control of the heat extraction apparatus 208, for example based on thermodynamic principles and models. However, in this example, a feedback loop is also used to adjust the cooling time and/or cooling profile as appropriate. In particular, the temperature sensor 216 is used to provide an indication of the temperature of the object (block 410). This is compared to the anticipated temperature according to the cooling profile (block 412). If the temperature differs (or differs by more than an acceptable amount) from the anticipated temperature, then the cooling time and/or cooling profile may be recalculated (block 414), and, in some examples, the heat extraction apparatus 208 controlled accordingly. In this example, the temperature is also logged and stored in the memory 214. This information may for example be used to inform future cooling profiles of similar objects (or the next time an object is generated to the same specifications), for example such that a more accurate cooling time, and/or a more appropriate cooling profile can be determined initially for that object.

In some examples therefore, such a feedback process may be used to enhance accuracy by monitoring temperature decay and dynamically recalculating the time for completion. In some examples, any change in the cooling time may also be reported to a user/operator for example by updating the display 212. Use of a feedback process may allow for correction if an object is, in fact, cooling more rapidly or slowly than is desired in the circumstances.

Figure 5:
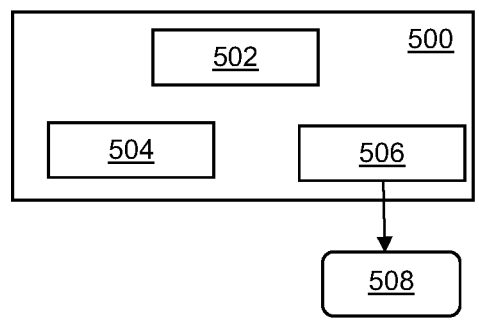
FIG. 5 shows an example of a processor to determine a cooling time for generated three-dimensional objects.

FIG. 5 shows an example of a processor 500. In this example, the processor 500 is arranged to execute computer readable instructions, and comprises a data determining module 502, a cooling time determining module 504 and a control signal generation module 506.

In particular, in executing the instructions, the data determining module 502 determines data indicative of at least one physical property related to heat transfer from an object produced by an apparatus arranged to generate at least one three-dimensional object in a layer-wise manner by heating a build material.

This data may for example be provided from a data source specifically associated with, or integral to, the processor 500, or remote therefrom. The data may be requested by the processor 500, or may be sent to the processor 500 without a query being received. The data may be any, or any combination of, the examples of physical property data mentioned herein. The data may comprise an output of a measuring device, such as apparatus for measuring mass (e.g. a weighing scale), a temperature sensor, or any meter associated with the object generation apparatus or process used to form the object. In other examples, the data may be extracted from a database or look-up table, or may be generated by processing circuitry, which may for example be arranged to derive data relating to physical property from a design model for controlling the formation of the object (e.g. a CAD model or the like). The data may be determined by accessing a computer memory.

The instructions further cause the cooling time determining module 504 of the processor 500 to determine a cooling time using the determined data. In addition, in this example, the instructions further cause the control signal generation module 506 of the processor 500 to generate an output control signal 508 according to the determined cooling time. In some examples, this output control signal 508 may be used to directly or indirectly control any, or any combination, of a display to display information relating to the cooling time, a safety interlock to prevent access to an object until it is safe to handle, heat extraction apparatus, for example to assist in cooling the object, or the like. The processor 500 may be associated with a memory, as shown in FIG. 2, and may provide the processor 218 of FIG. 2.

Some examples described herein allow a cooling time of an object formed by additive manufacturing techniques to be determined by considering at least one physical property of a product of the apparatus which includes the generated object(s). In some examples, this may effectively shorten a waiting time to handle an object, as such waiting times have tended to be standardized to take account of the 'worst case' (i.e. they are configured to allow time for a theoretical object with the longest possible cooling time to cool). In other examples, it may enhance safety. In other examples, the method may provide accurate information allowing an operator to better utilize their time. In still further examples, the cooling time may be controlled to meet at least one performance criteria such as wait times, object quality measures or energy usage.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operation steps to produce computer-implemented processing, thus the instructions executed on the computer or other programmable devices provide a step for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents.

The features of any dependent claim may be combined with the features of any of the independent claims or other dependent claims.

The invention claimed is:

1. A method of controlling a generation apparatus for generating a three-dimensional object, wherein the object is generated by heating a build material to cause coalescence of the build material, the method comprising:
    determining data indicative of at least one physical property affecting heat transfer from the object, wherein the at least one physical property comprises at least one of: an object weight, an object mass, an object volume, an object dimension, or a structure of an object;
    determining a cooling time for the object using the determined data; and
    controlling a component of the generation apparatus in response to the determined cooling time.

2. The method according to claim 1, further comprising displaying an indication related to the cooling time.

3. The method according to claim 1, wherein of controlling comprises controlling an interlock to allow access to the object after the determined cooling time has elapsed.

4. The method according to claim 1, wherein the component of the generation apparatus comprises a heat extraction apparatus and wherein controlling the component comprises controlling the heat extraction apparatus to cool the object to the predetermined temperature.

5. The method according to claim 4, wherein determining the cooling time comprises determining in which the cooling time using at least one of a desired performance criteria and a property of the heat extraction apparatus.

6. The method according to claim 4, wherein controlling the component comprises controlling the heat extraction apparatus to control a heat extraction rate of the object.

7. The method according to claim 1, wherein the at least one physical property comprises at least one of a specific thermal conductivity of the object, a number of layers used in generation of the object, a volume of build material used in generation of the object, a location of another object within the object receptacle, a number of other objects within the object receptacle, an arrangement of other objects within the object receptacle, or physical properties of other objects within the object receptacle.

8. The method according to claim 1, wherein determining the cooling time comprises determining the cooling time using a temperature associated with the generation of the object.

9. The method according to claim 1, further comprising:
    monitoring at least one temperature indicative of the temperature of the generated object; and
    at least one of: recalculating the cooling time according to the monitored temperature;
    controlling a heat extraction rate; or logging the temperature.

* * * * *